United States Patent
Duany (10) Patent No.: US 11,660,998 B1
(45) Date of Patent: May 30, 2023

(54) PORTABLE DWELLING UNIT AND CONSTRUCTION THEREOF

(71) Applicant: Andrés Duany, Miami, FL (US)

(72) Inventor: Andrés Duany, Miami, FL (US)

(*) Notice: Subject to any disclaimer, the term of this patent is extended or adjusted under 35 U.S.C. 154(b) by 108 days.

(21) Appl. No.: 17/204,645

(22) Filed: Mar. 17, 2021

Related U.S. Application Data (60) Provisional application No. 62/990,859, filed on Mar. 17, 2020.

(51) Int. Cl.
| | |
|---|---|
| *B60P 3/36* | (2006.01) |
| *B60R 15/00* | (2006.01) |
| *B60R 3/00* | (2006.01) |
| *E04H 15/08* | (2006.01) |
| *B60D 1/167* | (2006.01) |
| *B60N 2/005* | (2006.01) |
| *B60P 3/34* | (2006.01) |
| *B60H 1/00* | (2006.01) |
| *B60N 3/00* | (2006.01) |

(52) U.S. Cl.
CPC ............... *B60P 3/36* (2013.01); *B60D 1/167* (2013.01); *B60H 1/00364* (2013.01); *B60N 2/005* (2013.01); *B60N 3/001* (2013.01); *B60P 3/343* (2013.01); *B60R 3/00* (2013.01); *B60R 15/00* (2013.01); *E04H 15/08* (2013.01)

(58) Field of Classification Search
CPC ... B60P 3/36; B60P 3/38; B60R 15/04; B60R 15/02; B60R 15/00
USPC .......................................... 296/164, 168, 24.3
See application file for complete search history.

(56) References Cited

U.S. PATENT DOCUMENTS

| | | | | |
|---|---|---|---|---|
| 5,171,037 A | * | 12/1992 | Thompson | B62D 25/168 224/42.31 |
| 5,816,616 A | * | 10/1998 | Boyd | B62D 63/08 280/847 |
| 9,302,605 B1 | * | 4/2016 | Van Pelt | B60P 3/34 |
| 2002/0180174 A1 | * | 12/2002 | Johnston | B60R 3/00 280/164.1 |

FOREIGN PATENT DOCUMENTS

| | | | | | |
|---|---|---|---|---|---|
| CH | 708364 A2 | * | 1/2015 | | B60P 3/32 |
| CN | 106080366 A | * | 11/2016 | | B60P 3/32 |
| DE | 3804132 A1 | * | 8/1989 | | |
| WO | WO-0103972 A1 | * | 1/2001 | | B60P 3/32 |

OTHER PUBLICATIONS

Machine Translation of CN-106080366-A.*

* cited by examiner

*Primary Examiner* — Dennis H Redder
*Assistant Examiner* — Kevin P Weldon
(74) *Attorney, Agent, or Firm* — Malloy & Malloy PL; Jennie S Malloy; Peter A. Matos (57) ABSTRACT

A portable dwelling unit comprises a novel floor plan configuration providing a full height bathroom, bedroom, kitchen, and seating area in a portable dwelling that fits within a standard parking spot. Other features and advantages of the present invention include a multi-function table, outdoor dining space, and additional storage capacity beyond what would be available in a traditional trailered dwelling unit.

11 Claims, 8 Drawing Sheets

SECTION THROUGH CORRIDOR

FIGURE 9 - PASSENGER SIDE FRAMING

FIGURE 10 - FRONT SIDE FRAMING

FIGURE 11 - DINING TABLE - BOTTOM VIEW

FIGURE 12 - DINING TABLE - ELEVATION

PORTABLE DWELLING UNIT AND CONSTRUCTION THEREOF

This patent application claims priority to U.S. Provisional patent application, namely, having Ser. No. 62/990,859 and a filing date of Mar. 17, 2020, with the contents of this prior application being incorporated herein by reference in their entirety.

BACKGROUND OF THE INVENTION

Field of the Invention

The present invention relates to portable dwelling units and advances in the interior and exterior configurations thereof to provide more efficient use of the available spaces. The present invention is also directed to a portable dwelling which is capable of fitting within the footprint of a standard parking space.

Description of the Related Art

Today's urban commuters are faced with an imbalance in the lack of affordable housing near urban employment centers. Residing in less densely populated metropolitan or suburban area typically leads to long commute traffic. The present invention seeks to provide a solution to this imbalance in affordable housing near urban employment centers by solving significant problems that have plagued the "tiny home" industry and have thus far prevented that market from penetrating mainstream real estate in the eyes of consumers.

Typically, these "tiny houses are expensive per square foot, lack proper living spaces and modern-day conveniences, such as laundry machines, dishwashers, and spacious bathrooms. Furthermore, some tiny homes can require complicated construction techniques. However, most importantly, a typical tiny home requires permanent real estate, which is not typically available or affordable in an urban center.

Thus, the present invention proposes to provide a portable small home, referred to as a portable dwelling unit, which can be placed in unused parking lots, parks, fields, lots awaiting development, etc. Small neighborhoods or developments can be created in these spaces for employees or students. The dwelling unit of the present invention can be parked on campuses of large corporations, hospitals, and universities for convenient living space adjacent to employment, reducing commute time as well.

Not only does the present invention provide a solution to the balance of affordable housing close to urban employment centers, but as will be discussed below, the present invention presents several advancements in the design and construction of small homes such that they will no longer be perceived as novelties or inconvenient.

SUMMARY OF THE INVENTION

As discussed above, one issue that the present invention solves is by improving the balance of affordable housing within proximity to local jobs. In a preferred embodiment, the present invention occupies a footprint no larger than a standard U.S. parking spot. Therefore, the dwelling units of the present invention may be placed in unused parking lots in proximity to the resident's employer or convenient transit station. Not only does this provide affordable housing within proximity to employment centers, but also alleviates traffic congestion caused by commuting.

In a preferred embodiment, the dwelling unit is situated on a rolling trailer frame, and is fabricated from plywood walls, ceiling, and floors affixed to a 2×4 frame. In at least one embodiment, the interior of the dwelling unit is also constructed from plywood, including interior walls, counters, doors, seating, sleeping surfaces, stairs, and storage spaces. Impact resistant windows are also preferable. The exterior of the dwelling may be clad in metal or other weather-resistant finishes. In a preferred embodiment the finished dwelling and trailer occupy a volume of no more than 8.6 feet wide, 30 feet long, and 13.5 feet tall. In such an embodiment, the height of the dwelling unit above the trailer is approximately 11 feet 2 inches to 11 feet 3 inches tall.

The dwelling of the present invention has been designed for urban sites and the stagnant real estate of unused parking lots or empty lots awaiting future development. These places provide an ideal opportunity to improve the balance of affordable housing within urban employment centers. The required utility infrastructure (including water and sewer) can be laid temporarily above ground (and possibly protected by a gravel bed), and easily removed and re-used when the site must be used for another purpose.

When constructed in accordance with a preferred embodiment of the present invention, the dwelling unit meets the standards set forth in Appendix Q of the 2018 Edition of the Residential Building Code (so called "Tiny Homes"). While an actual building permit is not available without a building site, as with many types of mobile and/or pre-fabricated housing, the dwelling unit may be certified by the National Organization of Alternative Housing to meet ANSI, NFPA, NEC, and other structural and energy efficiency standards. When combined with a trailer, the dwelling of the present invention may be permitted by local and state departments of motor vehicles. It can therefore be legally driven and parked on public roads and parking lots.

The construction of the present invention is also suitable to license for local manufacture, especially with the proliferation of "maker spaces" within the urban areas where the dwelling is designed to serve. The preferred embodiment of the present invention is fabricated mostly from plywood sheets and can be cut from CNC machines, which is a skill set and technology that is increasingly available at such maker spaces.

One of the inventive features of the dwelling is its ability to provide both a full height bathroom, bedroom area, kitchen, and seating area in such a confined space by making use of a multi-level configuration. In particular, the trailer frame supports wheels which protrude into the dwelling space and would otherwise be an intrusion into the available floor space. However, one feature of the present invention is the provision of a small ascending and descending staircase over the wheel well. This staircase provides access to the bathroom and kitchen area, which are set on the lowest level of the dwelling, as well as a full height area of the bedroom, which is set on a mid-level of the dwelling unit approximately 3-4 feet above the ground level. Within the bedroom area is a raised sleeping platform upon which a mattress can be placed. The raised sleeping area accommodates the head room of a full standing height bathroom (approximately 6 feet 4 inches) directly underneath the sleeping area. In a preferred embodiment, the bathroom occupies the same footprint as a queen-sized mattress, such that the sleeping area does not protrude further into the full height standing area of the bedroom any more than necessary. A further benefit of this arrangement is the availability of a small storage area, accessible from the bathroom, between the staircase and opposite wheel well, under the full height standing area of the bedroom. This can be used as a linen closet, storage for cleaning supplies, as well as providing space for a compact laundry machine and/or dryer.

A storage unit, which may include a combination of open shelving and a wardrobe, can be used to separate the bedroom area of the kitchen, living, and seating area. In a preferred embodiment, the storage unit need not extend all the way to the ceiling of the dwelling to facilitate air flow to the bedroom unit. Additionally, the back of the storage unit, facing the kitchen and seating area, provides an ideal location to mount a television set. The required cables and components can be hidden away in the storage unit.

Yet another inventive feature of the dwelling unit includes a multi-function table capable of fulfilling multiple roles within the kitchen and seating areas. The table is mounted on a pole between the kitchen and seating areas and is cantilevered from the pole such that it can translate along the pole and rotate about the pole. The table may also be secured along the length of the pole at predetermined heights. In this configuration, the table is deployable into and out of a plurality of operative dispositions. By way of example, the table may be rotated into the kitchen area in proximity to and at approximately the same height has the kitchen counter. Therefore, the table provides additional preparation space for cooking. The table may also be rotated into the seating area to be used as a dining and working surface. The table may also be lowered in proximity to the seating area in order to be used as a support for an additional cushion, which can transform the seating area from a bench configuration into a daybed/lounging configuration. Finally, the table may be raised against the ceiling of the dwelling to move it out of the way and provide more available floor space.

Other features of the present invention are directed to novel configurations which help to disguise the more unsightly, but necessary, structure and equipment of a portable dwelling. In one instance, the dwelling frame incorporates a notched configuration at the front, leading to a full height roof portion over most of the dwelling, and a lowered height roof portion over the seating area of the dwelling. The notched configuration can then be utilized as a mechanical deck to accommodate air conditioning units, gas tanks, solar panels, generators, and other mechanical and electrical equipment, which is typically accommodated at the A-frame of the trailer frame in an unsightly manner. In this regard, the equipment is far above ground and inboard, and thereby out of sight. It will be appreciated however, that the lowered height roof portion should be sufficiently below the raised height roof portion, that none of the equipment protrudes above the full height roof portion (or 13.5 feet above the road).

As mentioned above, the A-frame of the trailer frame is used to mount auxiliary mechanical and electrical equipment in a typical mobile dwelling. However, because those items are hosted on a mechanical deck, the trailer A-frame is unused. Therefore, one embodiment of the present invention proposes a deployable awning and picnic table mounted to the trailer A-frame in order to provide an outdoor seating and dining area as well as obscure a relatively unsightly portion of the trailer frame. An awning frame is attached to the trailer A-frame and supports a pivot arm. The awning is fixed to the pivot arm such that it can be stowed for travel and deployed to provide shade over the picnic table. The table is pivotably mounted to the trailer A-frame such that it can be folded down to substantially cover the A-frame or stowed in an upward orientation against the front of the dwelling unit.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

As is generally shown in FIGS. 1-8, a preferred embodiment of the dwelling unit 10 is depicted. The dwelling unit 10 includes a dwelling frame 120 disposed on a rolling trailer frame 100. The dwelling frame 120 includes a ceiling and roof having a full height region 121 and a reduced height region 122.

Figure 1:
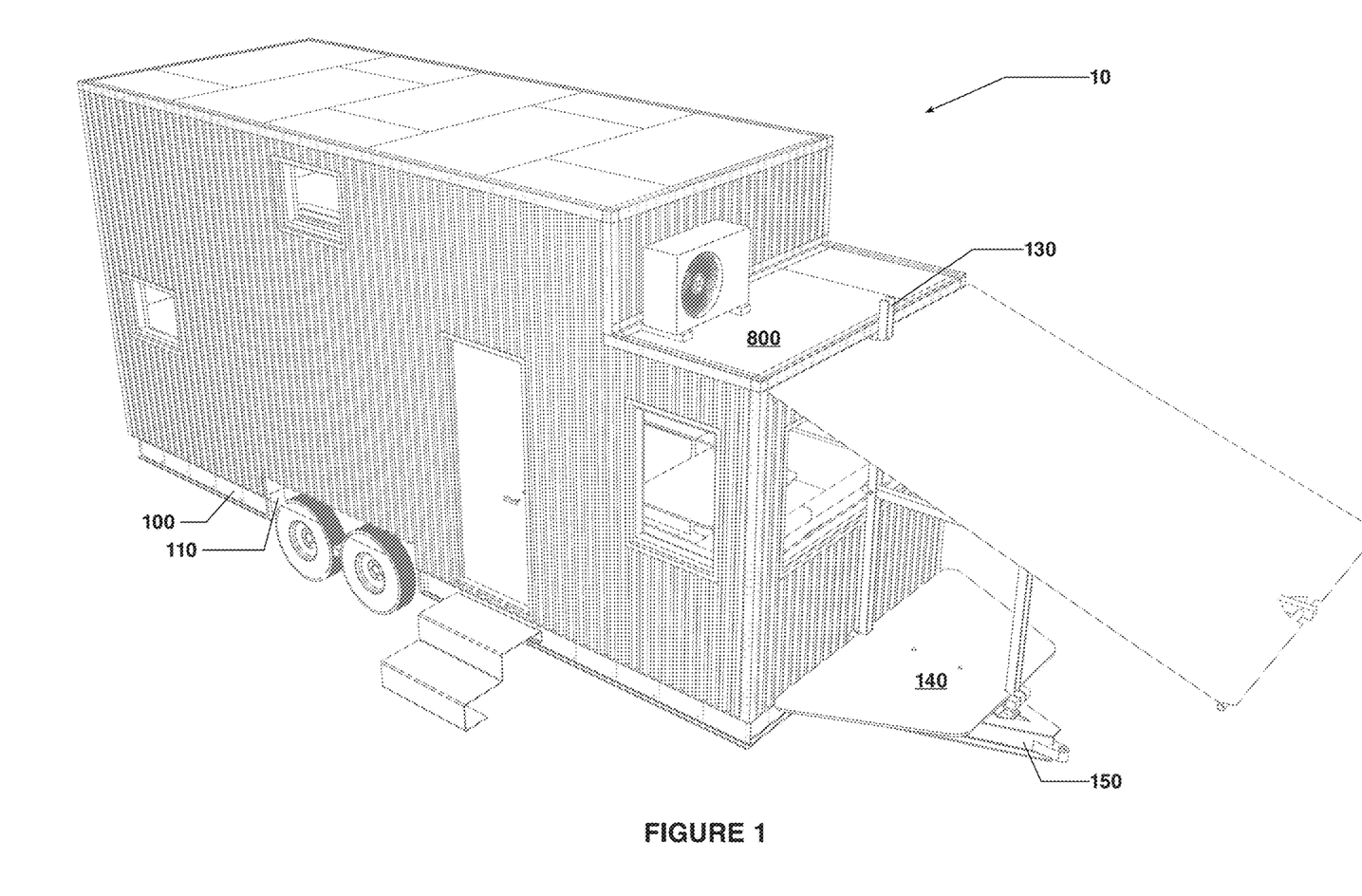
FIG. 1 is an exterior perspective view of a dwelling unit in accordance with one embodiment of the present invention.
Figure 2:
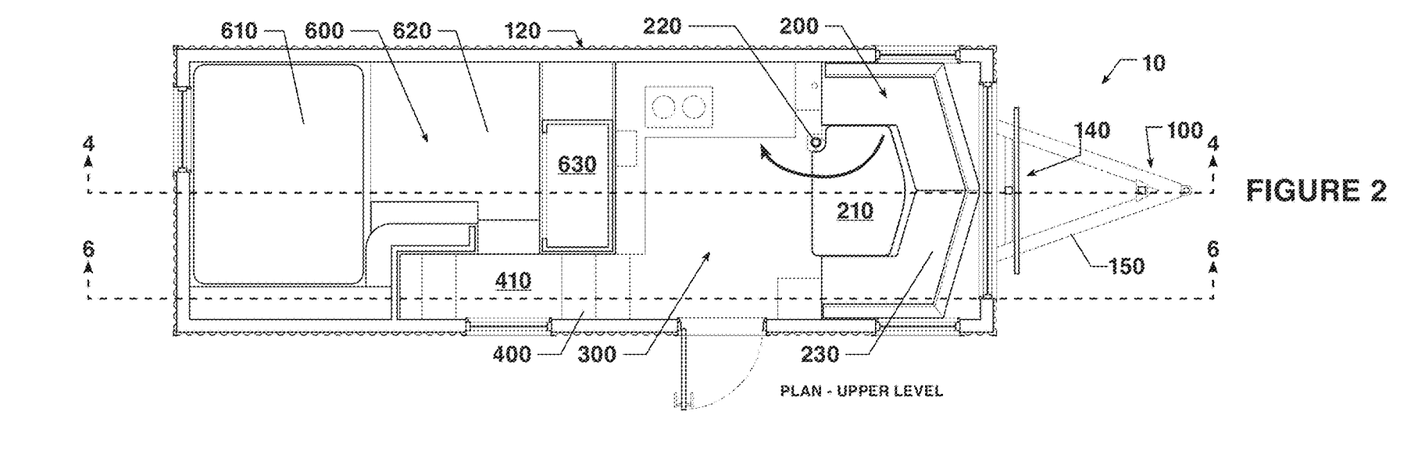
FIG. 2 is a floorplan view of an upper level of a dwelling unit in accordance with one embodiment of the present invention.
Figure 3:
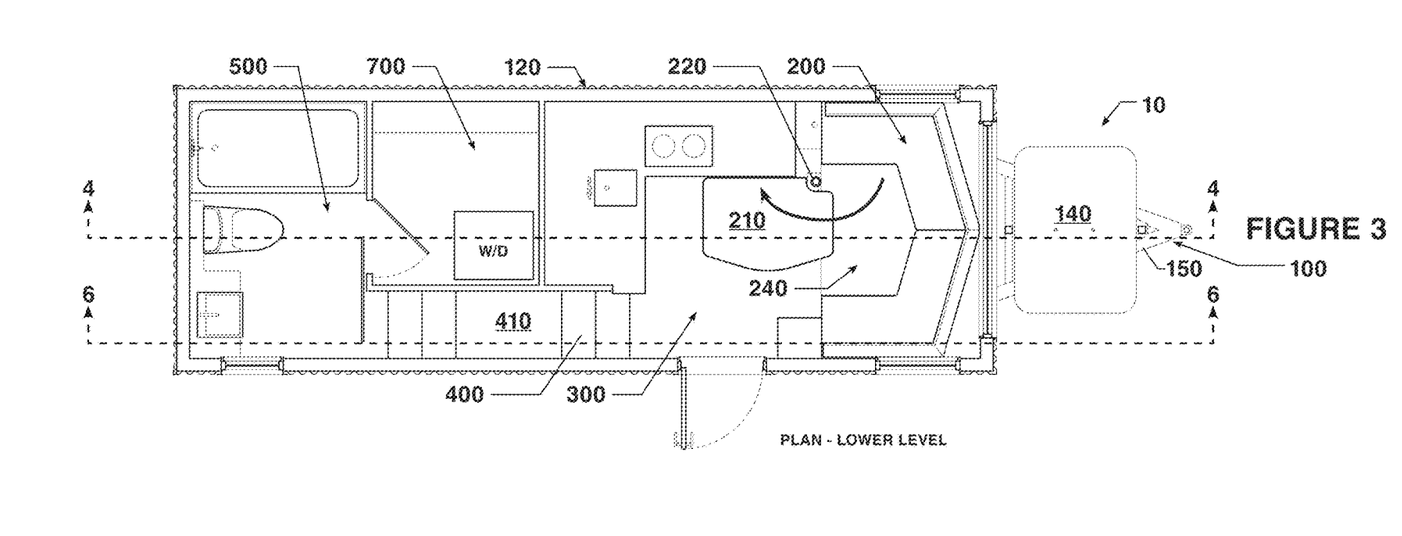
FIG. 3 is a floorplan view of a lower level of a dwelling unit in accordance with one embodiment of the present invention.

Also, and with initial reference to FIGS. 2 and 3, the interior of the dwelling 10 includes a multi-purpose seating area 200, a kitchen area 300, a staircase 400, a bathroom 500, a bedroom 600, and a storage closet 700. The bedroom 600 includes a full standing height region 620 adjacent to a sleeping area 610, which is highly advantageous to an occupant who is getting dressed. In addition, the sleeping area 610 is disposed above the bathroom 500 which is unique and also advantageous for reasons described herein.

A staircase 400 leads down from the bedroom to a first landing area 410 where the staircase 400 splits and provides access to both the bathroom 500 and the kitchen area 300.

Figure 4:
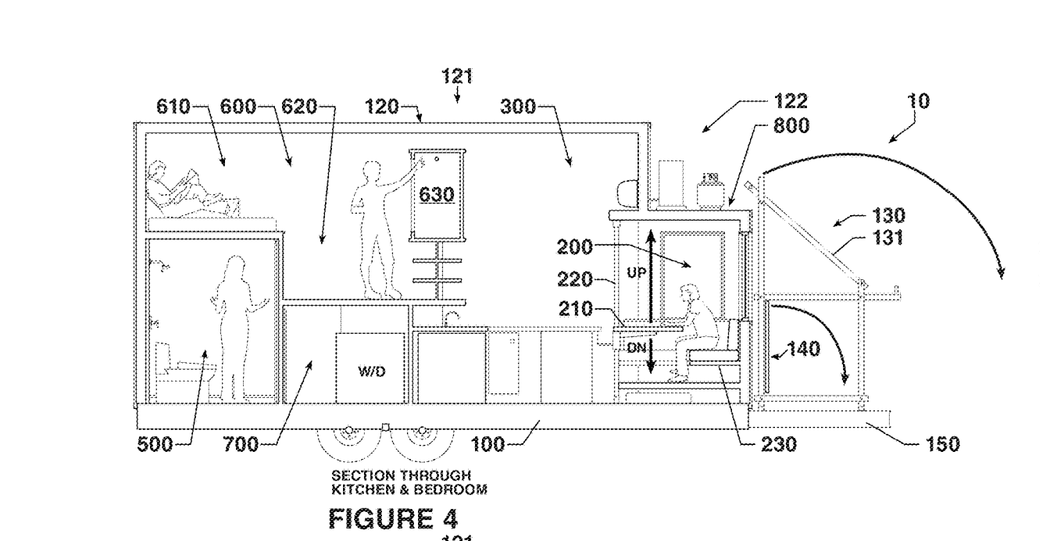
FIG. 4 is a left side section view of a dwelling unit in accordance with one embodiment of the present invention taken along line 4-4 of FIG. 3.
Figure 6:
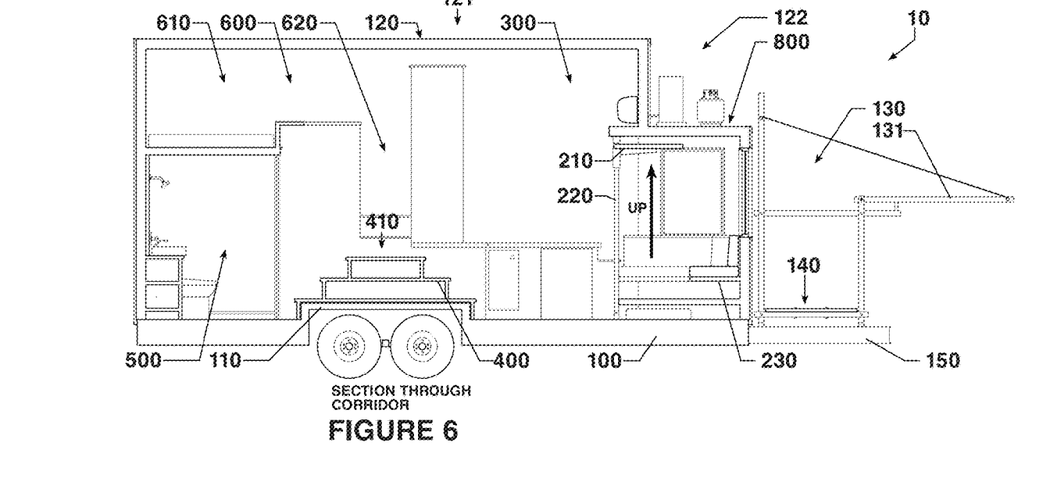
FIG. 6 is a left side section view of a dwelling unit in accordance with one embodiment of the taken along line 6-6 of FIG. 3.

Still referring to FIGS. 2 and 3, and as can be seen more specifically with reference to FIGS. 4 and 6, the full standing height area 620 of the bedroom 600 is disposed at a mid-level within the dwelling 10, and allows an occupant ample room while getting dressed, changing clothes or hanging clothes, sorting laundry etc. In a preferred embodiment, the total height of the dwelling 10 is between 11 and 12 feet tall. Thus, an average person can enjoy between 5 and 7 feet of headroom when not in the bedroom or bathroom. Conversely, the mid-level floor of the bedroom can be set between 4 and 5 feet above the floor and still provide ample headroom. Accordingly, space is created under the bedroom 600, between the staircase 400 and the opposite wheel well 110 which can be utilized as a closet 700. Given the height of this closet 700 and the available floorspace, it can accommodate a compact laundry machine and/or dryer.

In a preferred embodiment, the sleeping area 610 of the bedroom 600 is disposed over the bathroom 500. A support surface for a mattress also services as a ceiling for the bathroom 400. Additionally, the inventor(s) has found that a queen size mattress is an optimal configuration, not only because the dimensions coincide beautifully with a full size bathroom which is typically 5'×7' but because it provides adequate sleeping room for two adults and again, fitting a full bathroom within its footprint. Therefore, the sleeping area 610 need not be any larger than a queen size mattress, which leaves as much room as possible in the full height area 620 of the bedroom 600 to serve as a dressing area, office, and any other use that a bedroom may serve. The bedroom 600 may also include a storage unit 630 to serve as a wardrobe and dividing wall from the kitchen 300. The rear face of the storage unit 630 also serves as an ideal surface to mount a television withing the dwelling 10.

Still referring to FIGS. 2 and 3, and as can be seen more specifically with reference to FIGS. 4 and 6, there is, opposite the kitchen area 300 from the bathroom 500, a multi-purpose seating area 200. In the depicted embodiment the seating area includes a bench 230 which is substantially "C" shaped and includes a central recess 240. The central recess 240 accommodates a multi-function table 210 which is correspondingly shaped and dimensioned to fit within the recess 240. The table 200 is rotatably and slidably mounted to a pole 220. The pole 220 permits the table to rotate between the kitchen area 300 and the seating area 200. When the table 200 is rotated into the kitchen area 300, it can be adjusted to a height to serve as additional counter space in the kitchen 300. When rotated into the seating area 200, the table can be disposed into at least three separate operative positions along the pole 220. At its lowest height, the table 200 is substantially level with the support frame of the bench 230. When supplied with an additional cushion, the table 200 can then serve as an extension of the bench 230 thereby transforming it into a guest bed and/or day bed. The table 200 may also be raised to height to accommodate dining or working in the seating area and, in a third operative position, the table 200 may be placed at its uppermost extreme to open up the available floorspace within the dwelling 10.

As perhaps best illustrated in FIGS. 4-6 and 9, the roof of the dwelling 10 includes a stepped or notched configuration, with a full height region 121 along most of the dwelling frame 120 and a reduced height region 122 at the front of the dwelling 10, over the seating area 200. This configuration provides a mechanical deck 800 in which the typically unsightly mechanical equipment, such as air conditioners, gas tanks, generators, etc., can be incorporated into the dwelling in a manner that is hidden from view.

Figure 5:
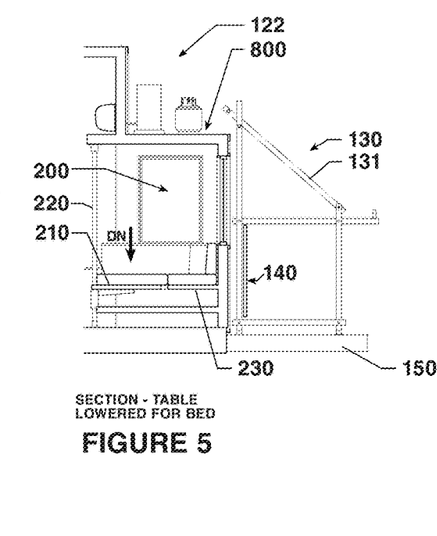
FIG. 5 is a detail section view of a dwelling unit in accordance with one embodiment of the present invention.

As shown in FIGS. 2-3, as well as in FIGS. 4-6, at the front of the trailer frame 100 is a trailer A-frame 150, which is a section that enhances stability and facilitates connection to a tow vehicle, but is generally not suitable for building upon as it must remain relatively clear during transport. Accordingly, to make use of this generally unusable and unsightly area, it can support a deployable awning and picnic table. An awning frame 130 can be attached to the trailer A-frame 150, which includes a pivot arm 131. The pivot arm 131 is configurable between a stowed and deployed configuration. One end of the awning is attached to the awning frame 130 while the other is attached to the pivot arm 131. Therefore, the awning can be stowed for transportation and deployed to provide shade. Similarly, the table 140 is pivotably attached to the awning frame 130 and is disposable between an upright, stowed configuration, and an operative configuration.

Figure 7:
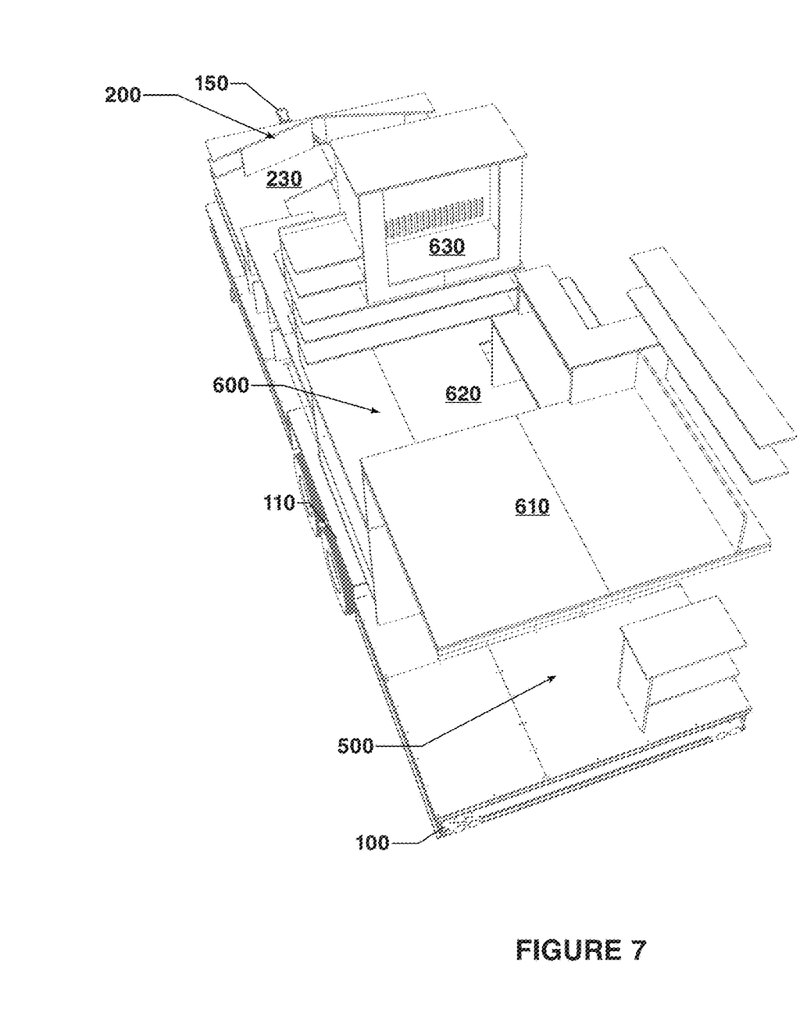
FIG. 7 is a rear perspective view of the interior of a partially constructed dwelling unit to facilitate understanding of the spatial relationships within the dwelling unit.
Figure 8:
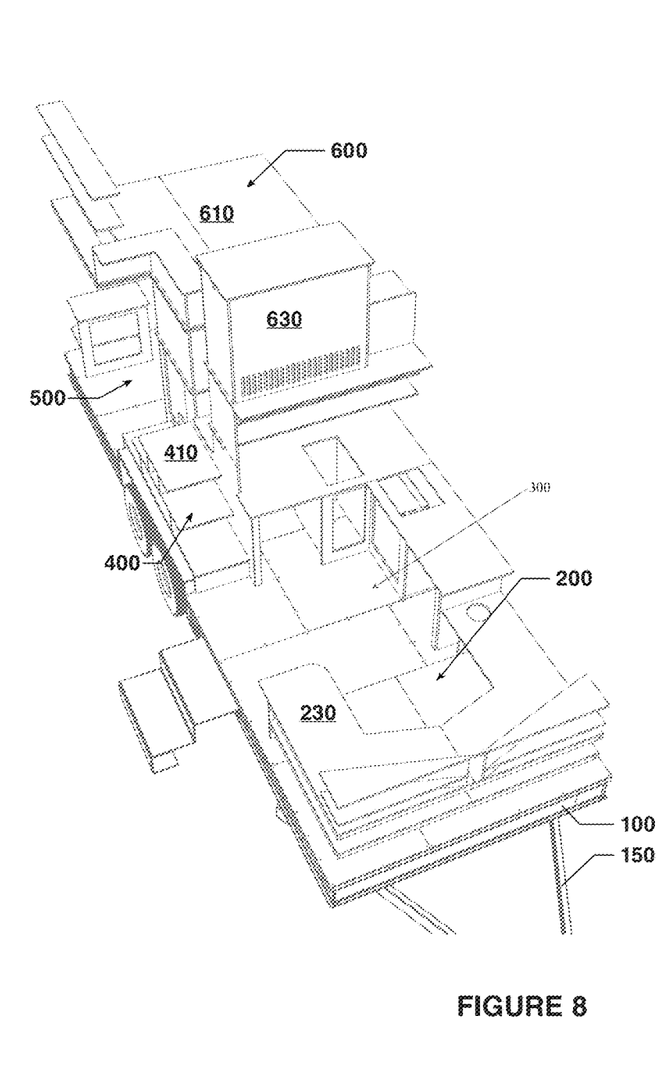
FIG. 8 is a front perspective view of the interior of a partially constructed dwelling unit to facilitate understanding of the spatial relationships within the dwelling unit.

FIGS. 7 and 8 present perspective views of a partially constructed dwelling such that the relationship between the staircase 400, bathroom 500, and bedroom 600 are more easily ascertainable. As can also be seen in FIGS. 7 and 8, virtually every surface in the dwelling 10 is flat, and very few surfaces contain curved edges. Accordingly, most surfaces within the dwelling 10 can be constructed of plywood using readily available tools, which will save time and labor costs, allowing for construction that is quick, efficient, and cost effective. However, for most efficient production a CNC cutting machine, such as a router, will optimize the manufacturing time.

Figure 9:
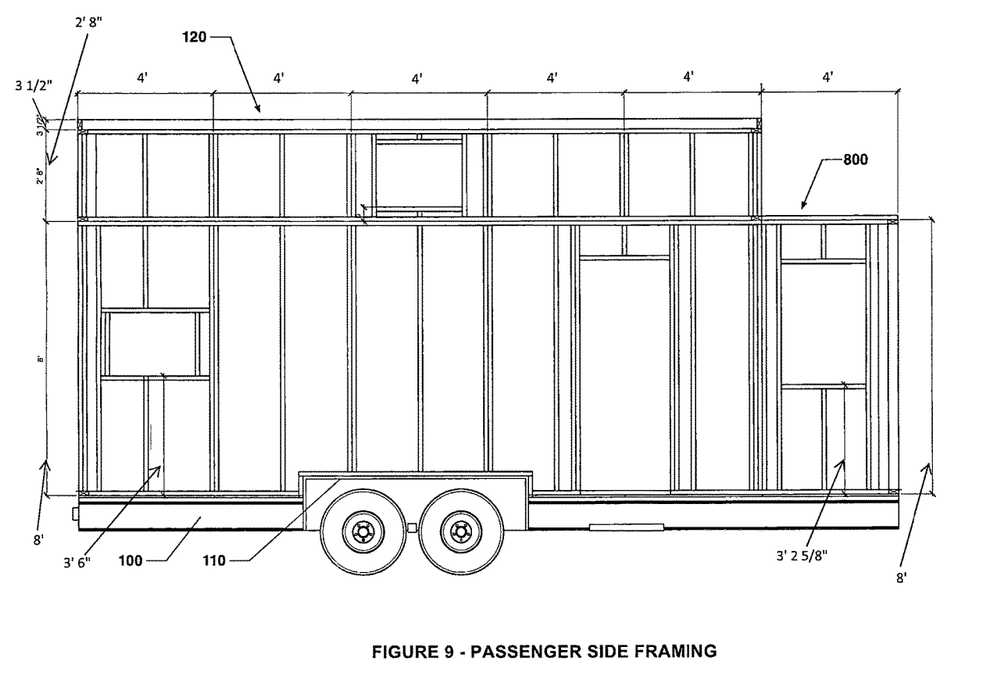
FIG. 9 is a left side plan view of a dwelling frame showing general dimension of the dwelling unit frame in accordance with a preferred embodiment of the present invention.
Figure 10:
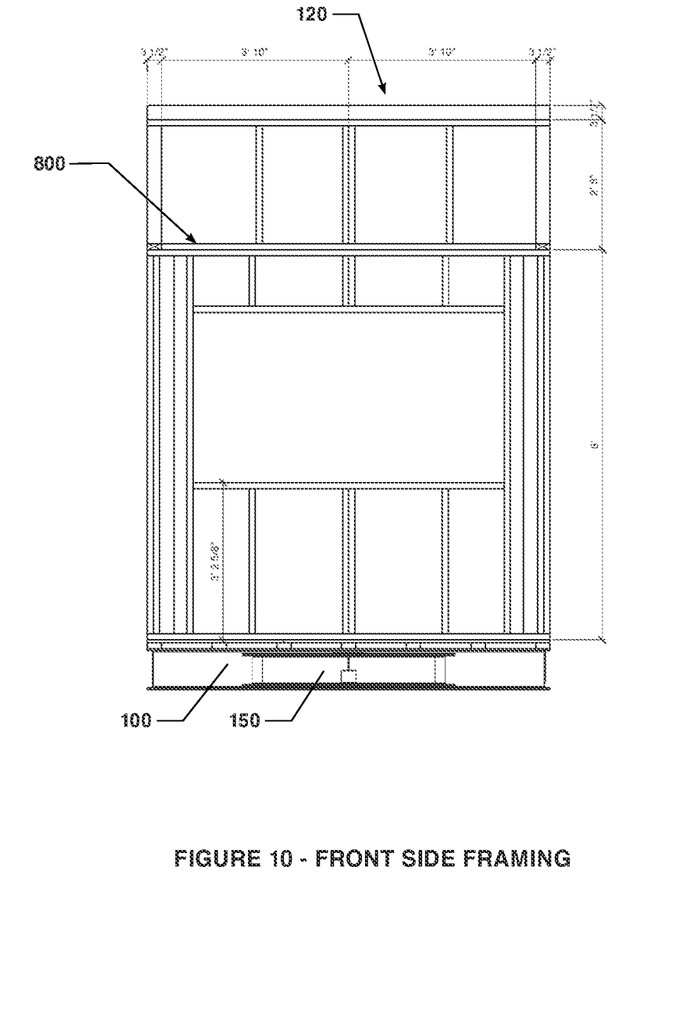
FIG. 10 is a front plan view of a dwelling frame showing general dimension of the dwelling unit frame in accordance with a preferred embodiment of the present invention.

Turning now to FIGS. 9 and 10, a side and front elevation of the dwelling frame 120 is presented along with the general dimensions of a preferred embodiment. The dwelling frame 120 can be constructed of 2×4 material, either wood or metal channels. Although it will be appreciated that affixing the plywood surfaces of the interior to wooden 2×4 material is easier and less expensive, otherwise specialty fasteners, such as self-drilling machine screws would need to be utilized for metal frame construction. As can be seen, the dwelling frame 120 is less than 8 feet wide and approximately 24 feet long (not including the trailer A-frame 150) and can easily be towed on roads. In addition, parking spaces in the U.S. are relatively standard at a recommended footprint of 9 feet wide by 18 feet long. While the entire dwelling 10 will protrude from a standard parking spot, this should not cause a problem because of the minimum standard 24 feet of driveway between rows of perpendicular or "straight in" parking spot dimensions. Angled parking presents even greater space savings and is, therefore, less of a concern. Accordingly, the dwelling unit of the present invention will take up no more space than what is already allocated, per car and inclusive of driveway space, to a standard parking spot.

Additionally, relevant U.S. Department of Transportation (DOT) guidelines recommend a maximum height of no more than 13.5 feet for the class of vehicles and trailers relevant to the present invention. Depending upon the exact height of the trailer frame 100 used, the dwelling frame 120 should be no more than 12 feet. In a preferred embodiment, the inventor has found that the optimal height of the dwelling frame 120 should be between 11 feet 2 inches and 11 feet 3 inches. This provides the optimal and efficient use of space to achieve the multi-level construction of the interior (providing full height bathroom and bedroom regions) while maintaining an overall height of the dwelling 10 below the relevant regulations.

Figure 11:
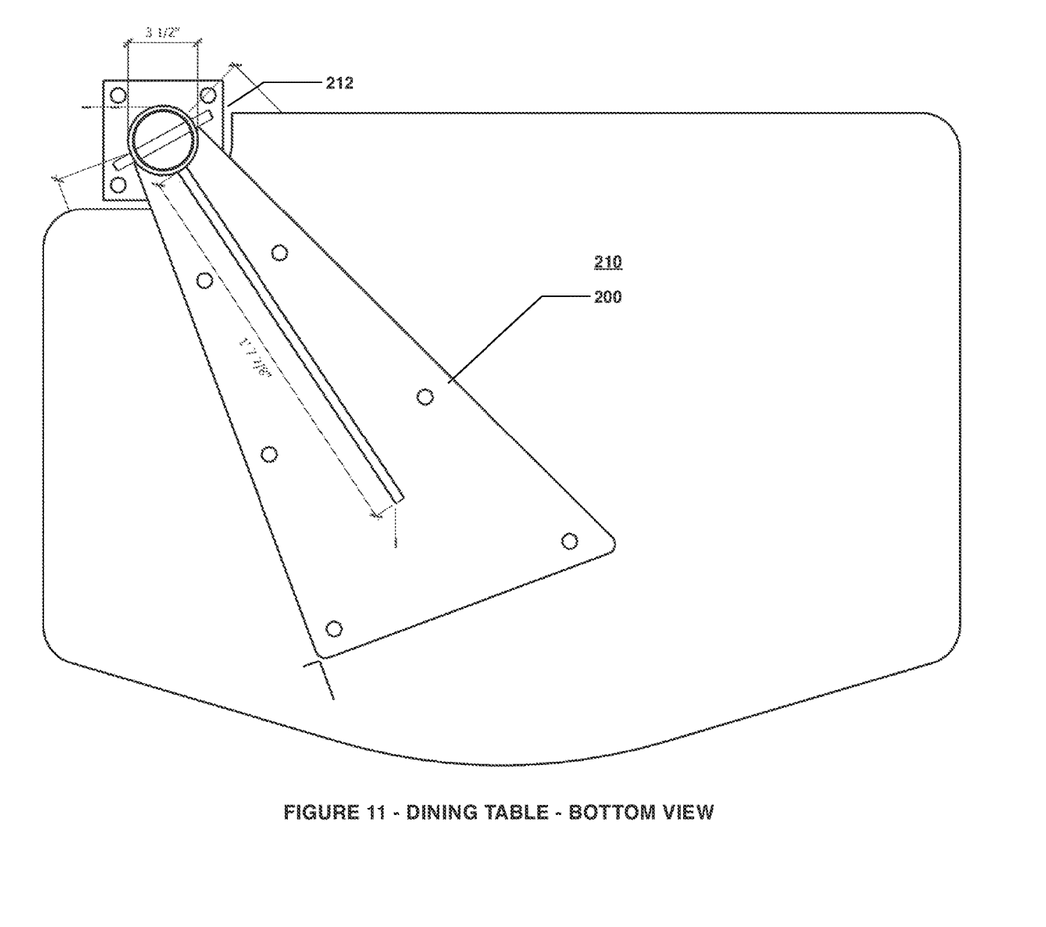
FIG. 11 is a bottom view of a multi-function table in accordance with one embodiment of the present invention.
Figure 12:
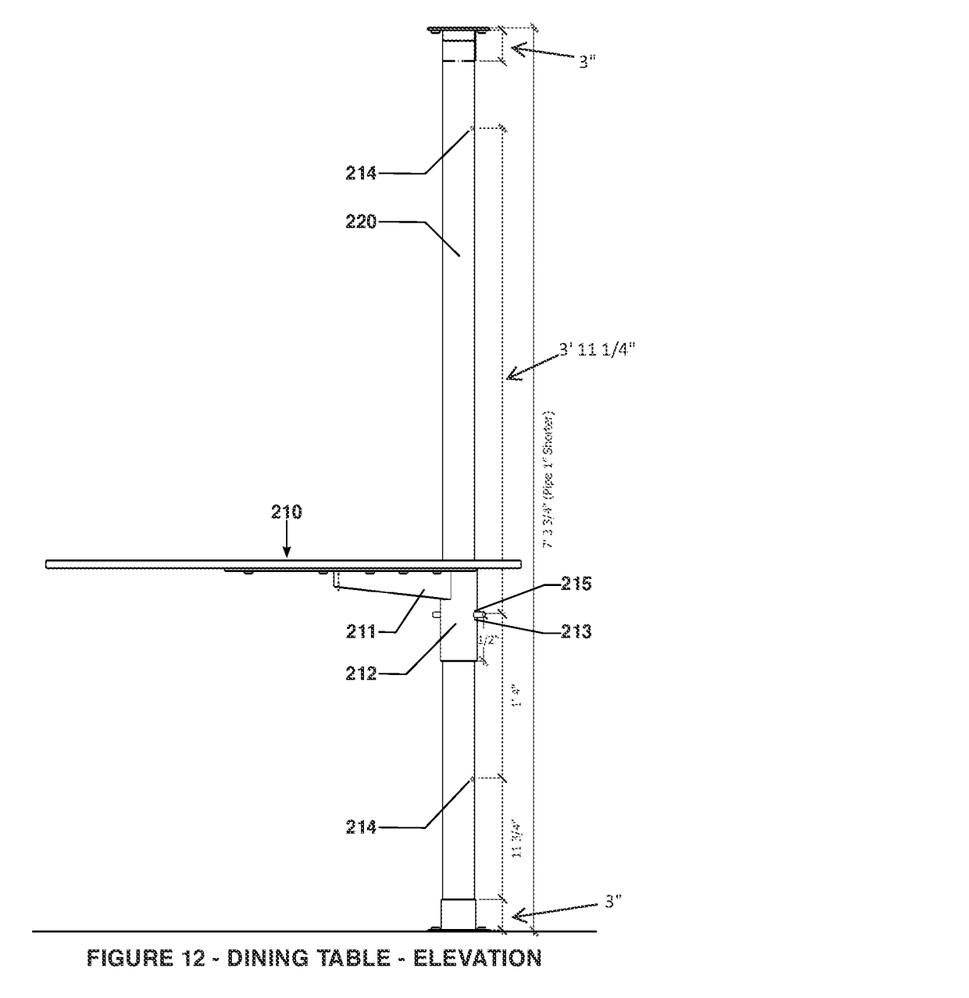
FIG. 12 is a side view of a multi-function table mounted to a pole in accordance with one embodiment of the present invention.

FIGS. 11 and 12 provide further detail into the construction and operation of the multifunction table 210. As can be seen, a bracket 211 and collar 212 are affixed to the underside of the table 210. The collar 212 is disposed about the pole 220, while the bracket 211 permits a cantilevered configuration of the table away from the pole 220. The collar 212 permits the table 210 to pivot about the pole 220. The collar 212 also includes apertures 213 cross drilled into the collar 212. Corresponding apertures 214 in the pole 220 align with apertures 213 in the collar 212 such that a pin 215 can be disposed through both apertures 213 and 214 to hold the table 210 at the desired height along the pole. The bracket 211 may also be configured to rotate relative to the collar 212 as well, such that a user need not remove the pin 215 in order to pivot the table 210.

Since many modifications, variations and changes in detail can be made to the described embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A portable dwelling having a trailer frame and a wheel well, the portable dwelling comprising:
    a bathroom area at the rear of the dwelling and a sleeping area above said bathroom area;
    a set of stairs ascending over one side of the wheel well and descending over another side of the wheel well, providing a first landing area above the wheel well; and
    said set of stairs further providing access to a bedroom area of the dwelling.

2. The portable dwelling recited in claim 1 wherein the bathroom area occupies a footprint of no more than approximately 60 inches by 80 inches.

3. The portable dwelling as recited in claim 2 wherein the bathroom area has a ceiling height of at least 6 feet 4 inches.

4. The portable dwelling as recited in claim 3 wherein an overall height of a dwelling frame of the portable dwelling is not more than 11 feet 3 inches above a trailer frame of the portable dwelling.

5. The portable dwelling as recited in claim 1 wherein said sleeping area is included within a bedroom and is adjacent to a full height standing area within said bedroom.

6. The portable dwelling as recited in claim 5 wherein said full height standing area is disposed at a mid-level within the portable dwelling.

7. The portable dwelling as recited in claim 6 wherein said mid-level is not more than approximately 4 feet above ground level.

8. The portable dwelling as recited in claim 5 wherein said set of stairs connects said bedroom to said first landing area above the wheel well.

9. The portable dwelling as recited in claim 7 wherein said bathroom is accessible by descending said stairs over said wheel well.

10. The portable dwelling as recited in claim 1 wherein said sleeping area includes a support surface for a mattress.

11. The portable dwelling as recited in claim 10 wherein said support surface for a mattress also serves as a ceiling for said button.

* * * * *

UNITED STATES PATENT AND TRADEMARK OFFICE
CERTIFICATE OF CORRECTION

| | | |
|---|---|---|
| PATENT NO. | : 11,660,998 B1 | Page 1 of 1 |
| APPLICATION NO. | : 17/204645 | |
| DATED | : May 30, 2023 | |
| INVENTOR(S) | : Andrés Duany | |

It is certified that error appears in the above-identified patent and that said Letters Patent is hereby corrected as shown below:

In the Claims

In Column 8, Line 32, Claim 11, the word "button" should be corrected to --bathroom--.

Signed and Sealed this
Ninth Day of January, 2024

Katherine Kelly Vidal
*Director of the United States Patent and Trademark Office*